Patented June 3, 1930

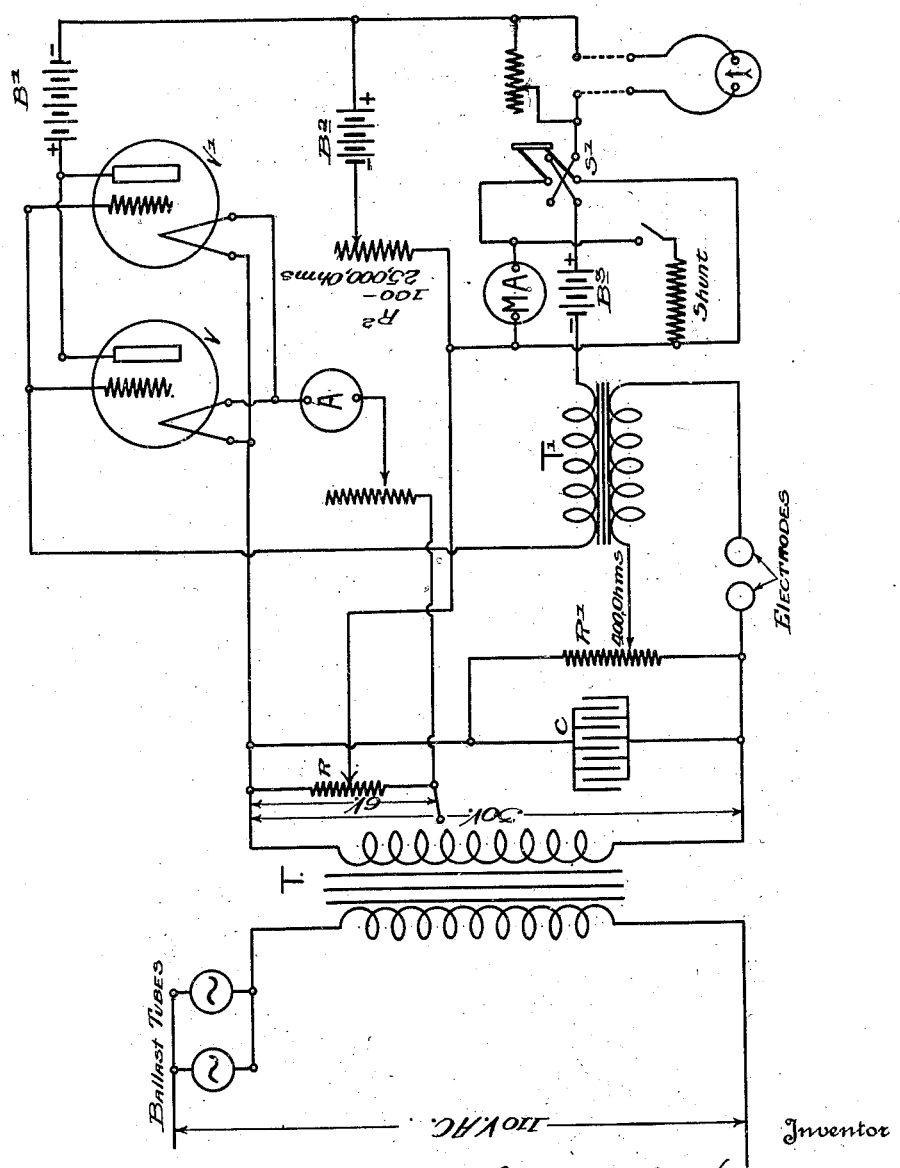

1,761,476

UNITED STATES PATENT OFFICE

STARKE R. HATHAWAY, OF ATHENS, OHIO

APPARATUS FOR MEASURING PSYCHOGALVANIC RESPONSES

Application filed January 20, 1928. Serial No. 248,202.

This invention relates to an apparatus for measurement of the psychogalvanic response in human beings and animals.

It is a well recognized phenomenon that certain mental states in humans and animals are closely allied to emotions and that in response to such mental states or emotions there is a change or variation in the electrical conductivity of the skin of the body. This phenomenon is designated the psychogalvanic response, or the psychogalvanic reflex, galvanic response or tachographic response.

An object of the invention is to provide a simplified method of and apparatus for measuring the psychogalvanic response set up in the human or animal body when it is subjected to such processes as the sudden realization of success or failure in working problems, psychological tests, etc. The apparatus gives a measurable reading of the amount of galvanic reflex response in magnitude and frequency in various individuals, which information is invaluable in classifying groups of human beings as to their reactions and emotions.

The accompanying drawing is diagrammatic of the circuit of the apparatus utilized for carrying out the above object. This apparatus is, of course, subject to modification and rearrangement without departing from the spirit of the invention. It will be noted that the usual 110 volt alternating current house line is utilized, as this is most practical, although, of course, direct current from batteries might be employed.

Current supply from the 110 volt line is fed to the primary transformer T, from the secondary side of which is tapped the 6 volt filament current for lighting the three element thermionic tubes V and $V_1$. This transformer is also tapped so that an output current of 30 volts is available for the electrode potential. It will be noted that a plurality of ballast tubes are placed in the primary transformer circuit and a fixed condenser in the secondary circuit. These devices, while not essential to the operation of the apparatus, tend to minimize the variations of line voltage which might intrude to a degree affecting the sensitiveness of the apparatus.

A low frequency transformer T is used for applying the grid voltage for the vacuum tubes. Two vacuum tubes are used in parallel in this instance since current amplification is desired. The tubes perform the double function of rectification of the alternating current and amplification of the changes in the amount of current flowing in the circuit. This also permits a preliminary stepping up of the potential. By proper selection of this transformer the secondary output will not vary enough to cause a loss of sensitivity due to overcharging of the grids. Negative grid potential is applied by a battery $B_3$ at 22½ volts and this potential is kept constant for most uses. Since it is desirable to have approximately the same initial electrode current for each individual subject tested, the voltage is set to a value which is dependent on the characteristic curve of the vacuum tubes used.

The plate voltage for the vacuum tubes is supplied by the batteries $B_1$ which carry 90 volts. As it is necessary to neutralize the constant plate voltage if small incremental changes are to be read on the milliammeter, battery $B_3$ is connected so as to send a current through the meter in the direction opposite from that normally flowing in the plate circuit, this counter-current being controlled by a shunt.

Advantage is taken of the fact that the grid current varies substantially directly with the grid voltage. To utilize this, a double pole double throw switch $S_1$ is placed in the circuit so as to change the plate milliammeter from the plate circuit to the grid circuit for preliminary adjustment of the electrode potential, the strength of the grid current for maximum sensitivity being approximately .01 milliampere. In practice the electrodes used are of nickel and about 2.2 cm. in diameter.

From the above description of the apparatus it will be seen that when a human or animal subject has the electrodes in contact with the skin of the body, as the palms of the hands or paws, and the body is subjected to emotional stresses, as success or failure in solving problems, etc., there will be a change in the conductivity of the subject's skin which increases the resistance in the electrical circuit of the apparatus. This change in conductivity varies the electrical circuit to an extent which effects the electronic flow through the vacuum tubes and is recorded on a sensitive milliammeter or galvanometer. This meter reading gives the amount of change which is translated by those skilled in the art to give a basis for analyzing the psychogalvanic response in the subject.

It will be noted that the amount of current flowing between the electrodes may be varied by $R_1$ so that the grid potential may be kept at nearly the same value regardless of the difference in skin resistance and conductivity of various patients or subjects, the electrode being generally adjusted by the potentiometer until a reading of .01 milliampere is obtained on the milliammeter in the grid circuit.

For the purpose of taking photographic records and for student class demonstrations where it is desired to throw a spot of light on a screen so that the class may observe the reactions, a shunt control and an external reflecting galvanometer are provided. This is clearly shown in the diagrammatical circuit.

Claim:

An apparatus for electrically measuring psychogalvanic responses in human beings when subjected to emotional strain, which consists of an electrical alternating current circuit, electrodes in said circuit adapted to be placed in contact with the human being's skin, a thermionic amplification device including a grid potential, means for adjusting the grid potential and means for indicating on an electrical measuring instrument the variations of resistance of the electrodes.

STARKE R. HATHAWAY.